United States Patent Office 2,756,460
Patented July 31, 1956

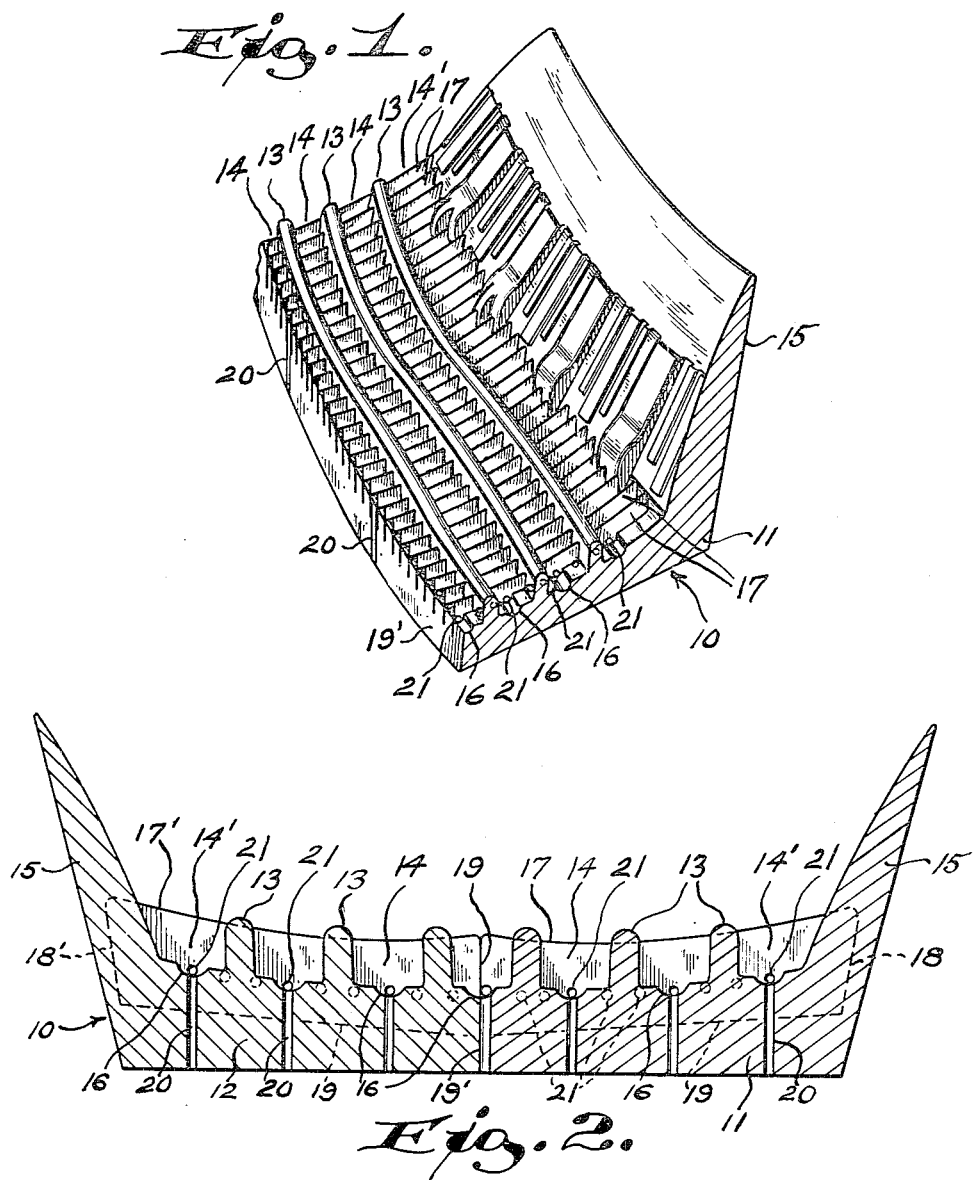

2,756,460

TIRE TREAD MOLDS

James C. Heintz, Jr., Cleveland, Ohio, assignor of one-half to Lloyd L. Felker, Marshfield, Wis., and one-half to David E. Crooker, Ontonagon, Mich.

Application September 9, 1954, Serial No. 454,862

3 Claims. (Cl. 18—44)

This invention relates to improvements in tire tread molds.

Tire treads of the type having circumferentially extending rider strips have been found to give improved traction if the rider strips are provided with a multiplicity of transverse slits known in the trade as sipes. Attempts to form these slits during the molding process have presented problems because air tends to get trapped in compartments formed between sipe-forming partitions of the mold. As a result it is common practice to cut sipes in the tread after molding.

It is a general object of the present invention to provide an improved mold for forming a tire tread wherein sipes may be successfully formed during the molding process, and wherein novel means is provided for effectively eliminating the possibility of trapping air in the matrix.

A further object of the invention is to provide a mold as above described which is suitable for use in forming sipes through either straight or serpentine ribs of a tire.

With the above and other objects in view, the invention consists of the improved tire mold, and all of its parts and combinations, as set forth in the claims, and all equivalents thereof.

In the accompanying drawing, illustrating one embodiment of the invention, in which the same reference numerals designate the same parts in all of the views:

Fig. 1 is a fragmentary perspective view looking at the interior of one of the half-sections of a matrix; and Fig. 2 is a transverse sectional view through both portions of the matrix showing them in assembled relationship.

Referring more particularly to the drawing, the numeral 10 designates a matrix generally, which matrix comprises a circular half section 11 and a cooperating circular half-section 12. Formed in the interior of the matrix are spaced, circumferentially extending ribs 13 to provide circumferentially extending grooves 14 therebetween, the outermost grooves 14' being formed between each outermost rib 13 and the adjacent side walls 15 of the matrix. These grooves are adapted to form the rider strips on the tire tread. For passenger car tires the grooves are ½ inch wide. In the preferred embodiment of the invention which has been illustrated, the bottom of each of the grooves 14—14' is provided with an annular concavity 16. Each concavity extends around the entire circumference of the mold and is of less width than its groove as is clear from the drawing, preferably about ¼ inch wide for passenger car tires.

Extending transversely of the matrix section 11 through the ribs 13 is a plurality of closely spaced, thin metal sipe-forming strips 17. Extending transversely of the other matrix section 12 are like strips 17'. One end of each of the strips 17 of the matrix section 11 is received in a suitable slot in the side wall 15 as at 18. The corresponding ends of the strips 17' of the matrix section 12 are received in suitable slots 18' in the side wall 15 of said matrix section 12. The other ends of the strips of the matrix sections abut as at 19 as the parting line 19' of the mold. The edge of each of the strips 17—17' which faces the interior of the mold is preferably concave as illustrated to more or less conform to the cross-sectional contour of the tread to be formed. The exposed edges of the ribs 13 of the matrix sections project inwardly of the mold beyond said last mentioned edges of the strips 17—17', and the opposite edges of the strips 17—17' project into the bottoms of the matrix sections such a distance as to be below the bottoms of the grooves, preferably to the depth 19—19' illustrated.

Extending through the bottoms of the matrix sections and affording communication between the atmosphere and the bottoms of the grooves 14—14' are air vent ducts 20. Those ducts 20 which communicate with the bottom of the divided central groove may be formed in the parting face of one of the matrix sections as shown in Fig. 1.

Where the matrix has the concavities 16 in the bottoms of the grooves as is illustrated, the inner ends of the air vent ducts 20 communicate with the bottoms of said concavities. The air vent ducts 20 of each groove are spaced about eight inches apart in an annular direction.

In order to form closely spaced sipes in the rider strips of the tire, it is preferred to have the metal strips about ¼ inch apart. This therefore creates a multiplicity of small compartments in the bottom of each of the grooves 14—14', only a few of which are in communication with the externally communicating air vent ducts 20 of the matrix sections. It would be impractical to provide one of these vents 20 for each of the many compartments between the strips 17. According to the present invention, each metal strip 17—17' has spaced holes 21 along its length. These holes are so spaced from the edges of the strip as to be above the bottommost portions of the grooves 14—14'. In addition, there is a sufficient number of holes, the holes being about a quarter of an inch apart for passenger car tire molds, so as to provide intercommunication between all of the compartments of a groove so that trapped air may travel from one compartment to another until it finds an outlet through one of the air vent ducts 20. In other words, each strip has at least one hole in communication with each one of the grooves which the strip traverses. Where the mold has a concavity 16 in the bottom of each groove, as is illustrated in the preferred embodiment, the holes 20 of the metal strips 17—17' which are exposed, are so located as to register with said concavities. Where there are no concavities the holes may be located higher to come just above the bottoms of the grooves 14.

In molding a tire with a matrix constructed in accordance with the present invention, air which is trapped in the individual compartments of the grooves between the sipe forming strips 17—17' will be forced into the concavities 16 and can then travel through the holes 21 of the metal strips, from one compartment to the next, until the air finds an outlet to the atmosphere through one of the communicating air vent ducts 20 of the matrix. As a result of this arrangement, it is possible to mold a tire tread having very closely spaced sipes in the rider strips, without fear of having trapped air interfere with the molding process.

While the invention is useful in molds for forming straight rider strips, the matrix sections illustrated have curved grooves 14—14' so as to form serpentine rider strips on the tire tread. By having the row of closely spaced holes 21 (¼ inch apart for passenger car tire molds) in each of the metal strips, each strip will have one or more holes 21 in communication with the bottom of each of the grooves 14—14' which it traverses, regardless of the waving extent of the groove, because the spacing of the holes bears such relationship with the amount of lateral waving of the grooves 14—14' as to insure that this results. For example, if the groove waves out of communication with the third hole from the end, it will wave into communication with the fourth hole. Thus effective venting of air is provided even when the rider strips which are to be formed by the mold are of a special serpentine design.

The curvature of the exposed edges of the metal strips 17—17' is such with respect to the contour of the tread as to provide a substantially even depth for the sipes in the rider strips all the way across the cross section of the tire.

Various changes and modifications may be made without departing from the spirit of the invention, and all of such changes are contemplated as may come within the scope of the claims.

What I claim is:

1. In a mold for forming a tire tread, an annular matrix having an outer periphery and provided with a plurality of spaced circumferentially extending rider-strip-forming grooves having bottoms and having air vent ducts leading externally from said bottoms to said outer periphery, said ducts in each groove being spaced circumferentially from one another, a multiplicity of spaced sipe-forming strips each extending transversely of a plurality of said grooves and transversely of the mold to provide a circumferentially extending row of compartments in each groove, there being a plurality of compartments separating one air vent duct from the next duct of a groove, each sipe-forming strip having a series of spaced holes along its length which are so spaced between the edges of the strip as to be above the bottommost portions of the matrix grooves, and each strip having a sufficient number of holes so spaced from each other that each strip has a hole in communication with each groove which the strip traverses whereby trapped air may travel from one compartment to another until it finds an outlet through an air vent duct.

2. In a mold for forming a tire tread, an annular matrix having an outer periphery and provided with a plurality of serpentine rider-strip-forming grooves each having a bottom and having air vent ducts leading externally from said bottom to said outer periphery, said vents in each groove being spaced circumferentially from one another, a multiplicity of spaced sipe-forming strips each extending transversely of a plurality of grooves and transversely of the mold to provide a circumferentially extending row of compartments, there being a plurality of compartments separating one air vent duct from the next duct of a groove, each sipe-forming strip having spaced holes along its length which are so spaced between the edges of the strip as to be above the bottommost portions of the groove, each strip having a sufficient number of holes so spaced from each other that each strip has a hole in communication with each groove regardless of the lateral extent of the serpentine grooves whereby trapped air may travel from one compartment to another until it finds an outlet through an air vent duct.

3. In a mold for forming a tire tread, an annular matrix having an outer periphery and provided with a plurality of serpentine rider-strip-forming grooves each having a bottom and having a circumferentially extending concavity in said bottom and having air vent ducts leading externally from said concavity to said outer periphery, said vents in said groove being spaced circumferentially from one another, a multiplicity of spaced sipe-forming strips each extending transversely of a plurality of said grooves and transversely of the mold to provide a circumferentially extending row of compartments in each groove, there being a plurality of compartments separating one air vent duct from the next duct of a groove, each sipe-forming strip having a series of spaced holes along its length which are so spaced between the edges of the strips as to be above the bottommost portions of the concavity, each strip having a sufficient number of holes so spaced from each other that each strip has a hole in communication with each groove which it traverses regardless of the lateral extent of the serpentine grooves whereby trapped air may travel from one compartment to another until it finds an outlet through an air vent duct.

References Cited in the file of this patent

UNITED STATES PATENTS

| Number | Name | Date |
| --- | --- | --- |
| 1,746,107 | De Mattia | Feb. 4, 1930 |
| 1,880,430 | Furnas | Oct. 4, 1932 |
| 2,275,582 | Bull | Mar. 10, 1942 |
| 2,297,017 | Overman | Sept. 29, 1942 |
| 2,298,729 | Zimmerman | Oct. 13, 1942 |
| 2,665,967 | Bean et al. | Jan. 12, 1954 |